United States Patent [19]

Kaul

[11] 4,414,532
[45] Nov. 8, 1983

[54] DISPLAY SYSTEM FOR AIRCRAFT LANDING GUIDANCE

[76] Inventor: Charles E. Kaul, 7101 Galgate Dr., Springfield, Va. 22152

[21] Appl. No.: 322,289

[22] Filed: Nov. 17, 1981

[51] Int. Cl.³ .......................... G08G 5/00; B64F 1/20
[52] U.S. Cl. ...................................... 340/26; 114/261; 244/114 R
[58] Field of Search ...................... 340/26, 25, 27 NA; 244/114 R; 343/5 LS, 5 GC; 114/261

[56] References Cited

U.S. PATENT DOCUMENTS

| | | | |
|---|---|---|---|
| 3,003,451 | 10/1961 | Lundin et al. | 340/26 |
| 3,158,834 | 11/1964 | Evans | 340/26 |
| 3,183,479 | 5/1965 | Austin | 340/26 |
| 3,775,741 | 11/1973 | Zechnowitz et al. | 340/26 |
| 4,158,885 | 6/1979 | Neuberger | 340/26 |

*Primary Examiner*—James J. Groody
*Attorney, Agent, or Firm*—Robert F. Beers; Henry Hansen; Armand M. Vozzo, Jr.

[57] ABSTRACT

An electro-optical display system, particularly useful aboard aircraft carriers, is disclosed for remotely aiding a pilot in the landing of an aircraft. A conventional radar receiver continuously tracks the aircraft and produces a digital data signal indicative of aircraft slant range and elevation angle. The digital data signal is provided to a signal processor governed in accordance with either of a pair of control guidance algorithms to produce a control signal indicative of the magnitude and direction of an error in the appropriate descent rate of the aircraft. Based upon the control signal, a display driver produces a plurality of drive signals for energizing discrete light cells in vertically-oriented arrays as a visual indication of the descent rate error for appropriate corrective action by the pilot.

9 Claims, 4 Drawing Figures

DISPLAY SYSTEM FOR AIRCRAFT LANDING GUIDANCE

STATEMENT OF GOVERNMENT INTEREST

The Government of the United States has a non-exclusive, irrevocable, royality-free license in this invention with power to grant licenses for all governmental purposes.

BACKGROUND OF THE INVENTION

The present invention relates to visual landing aid systems for guidance of aircraft, and more particularly to an improved electro-optical display system for enhancing visual cueing information remotely presented to a pilot during an aircraft landing approach.

Successful aircraft landings, particularly those aboard aircraft carriers, necessitate the highest degree of safety and control to insure maximum protection for personnel and equipment. In seeking to provide that degree of safety and control, visual landing aid systems have been generally used to guide the pilots of aircraft in their descent approach to aircraft carriers. One such visual landing aid system is the Fresnel Lens Optical Landing System (FLOLS) which provides primary glideslope displacement information to the pilot from the carrier deck. The FLOLS consists of a plurality of light sources situated behind a respective number, typically five, of vertically-stacked Fresnel lenses disposed between two horizontal ligh arrays, commonly known as datum bars. The array of lenses and lights provides a virtual image, as may be seen in FIG. 1, which appears to the pilot as a single light located some distance, typically about 150 feet, behind the datum bars. This single light, known as the meatball, is visible to the pilot through the center lens when he is within 9.5 minutes of arc of the desired glideslope, and is then seen as level with the datum bars. As the aircraft moves more than 9.5 minutes of arc above or below the glideslope, the meatball is seen through higher or lower Fresnel lenses, respectively, to give the appearance of moving vertically above or below the level of the datum bars so that the pilot may take corrective action to return the aircraft to the desired glideslope.

While the displacement information provided by the FLOLS has been valuable in providing feedback of relative aircraft position for glideslope control and guidance, the system has been somewhat less then optimum, having a limited capability, by inherent design, of indicating magnitude and direction of aircraft movement. Because the information provided by the FLOLS is of zero-order (displacement only), there are substantial time-lags between incorrect control inputs and the subsequent error information from the FLOLS. For example, relatively large changes in the descent rate of the aircraft can and do occur before meatball displacement on the Fresnel lens is perceived by the pilot. Furthermore, the inherent limitations of the FLOLS are compounded during night carrier landings, when there is a severe reduction in the natural visual cues used by the pilot to assist in azimuth and elevation estimation. The nightime reduction in these natural visual cues, such as expansion pattern relationships, surface texture gradients, peripheral streaming, and horizontal field-of-view discrimination, adversely affects the pilot's perceptual domain thereby rendering accurate control of azimuth and elevation far more difficult than during daylight operations and significantly increasing the risks of carrier landing accidents.

SUMMARY OF THE INVENTION

Accordingly, it is a general purpose and object of the present invention to provide an improved visual landing aid system for remotely guiding the descent approach of aircraft.

Another object of the present invention is to provide an optical display system for remote guidance of aircraft landings, particularly those aboard aircraft carriers, wherein visual presentation of information more closely simulates the control order and dynamics of the actual feedback loop between the pilot commands and the aircraft response.

Still another object of the present invention is to provide an optical display system that augments the FLOLS presently used to guide aircraft landings by enhancing the visual cueing information presented to the pilot through the addition of a visual indication of the magnitude and direction of aircraft movement relative to the desired glideslope.

A further object of the present invention is to provide a remote visual landing air for aircraft approaches that facilitates tracking of the desired glideslope during day or night operations so that the risks of landing accidents are significantly reduced.

A still further object of the present invention is to provide an improved aircraft landing aid system that is simple yet reliable in performance, readily interpreted by pilots, and easily adapted to existing carrier-based landing operations.

Briefly, these and other objects of the present invention are accomplished by an electro-optical display system, particularly useful aboard aircraft carriers, for remotely aiding a pilot in the landing of an aircraft. A conventional radar receiver continuously tracks the aircraft and produces a digital data signal indicative of aircraft slant range and elevation angle. The digital data signal is provided to a signal processor governed in accordance with either of a pair of control guidance algorithms to produce a control signal indicative of the magnitude and direction of an error in the appropriate vertical flight path component of the aircraft. Based upon the control signal, a display driver produces a plurality of drive signals for energizing discrete light cells in vertically-oriented arrays as a visual indication of the descent rate error for appropriate corrective action by the pilot.

For a better understanding of these and other aspects of the present invention, reference may be made to the following detailed description taken in conjunction with the drawing in which like reference numerals designate like parts throughout the figures thereof.

DESCRIPTION OF THE PREFERRED EMBODIMENT

Figure 1:
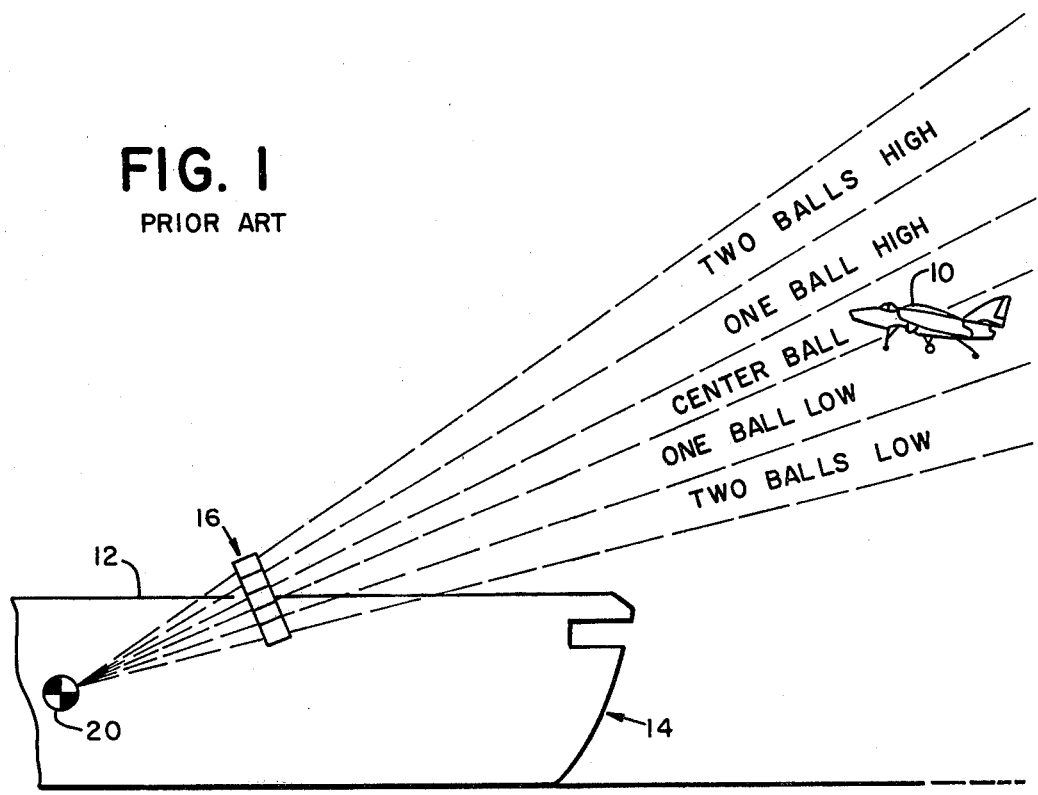
FIG. 1 is a schematic illustration of an aircraft approach to a carrier using a conventional FLOLS display to provide landing guidance.

Referring now to FIG. 1, there is shown aircraft 10 in a descent approach to the landing deck 12 of an aircraft carrier 14. Located on the landing deck 12 of carrier 14 is a FLOLS display 16 conventionally used to guide aircraft carrier landings by providing pilots with primary glideslops displacement information. The FLOLS display 16 consists of light sources (not shown) behind five vertically-stacked Fresnel lenses 18a–18e that are situated between a pair of horizontal light arrays 22a and 22b, better shown in FIG. 2. The horizontal light arrays 22a and 22b, called datum bars, are composed of a plurality of individual light sources 24 electrically interconnected and energized to provide a continuous visual reference line during landing operations.

In accordance with generally known optical techniques, the Fresnel display 16 provides a virtual image 20 appearing to the pilot of aircraft 10 as a single light source, called the meatball, at a distance of about 150 feet behind horizontal arrays 22a and 22b. Depending on the relative position of the aircraft 10 above or below the desired glideslope, the meatball is seen through different ones of the Fresnel lenses 18a–18e, with visibility of the meatball through center lens 18c typically indicating that the aircraft is within 9.5 minutes of arc of the glideslope. As aircraft 10 moves more than 9.5 minutes of arc above or below the glideslope, the meatball is seen through higher lenses 18a, 18b or the lower lenses 18d, 18e, respectively, relative to horizontal arrays 22a and 22b thereby providing the pilot with visual information indicative of glideslope displacement error requiring his corrective action.

Figure 2:
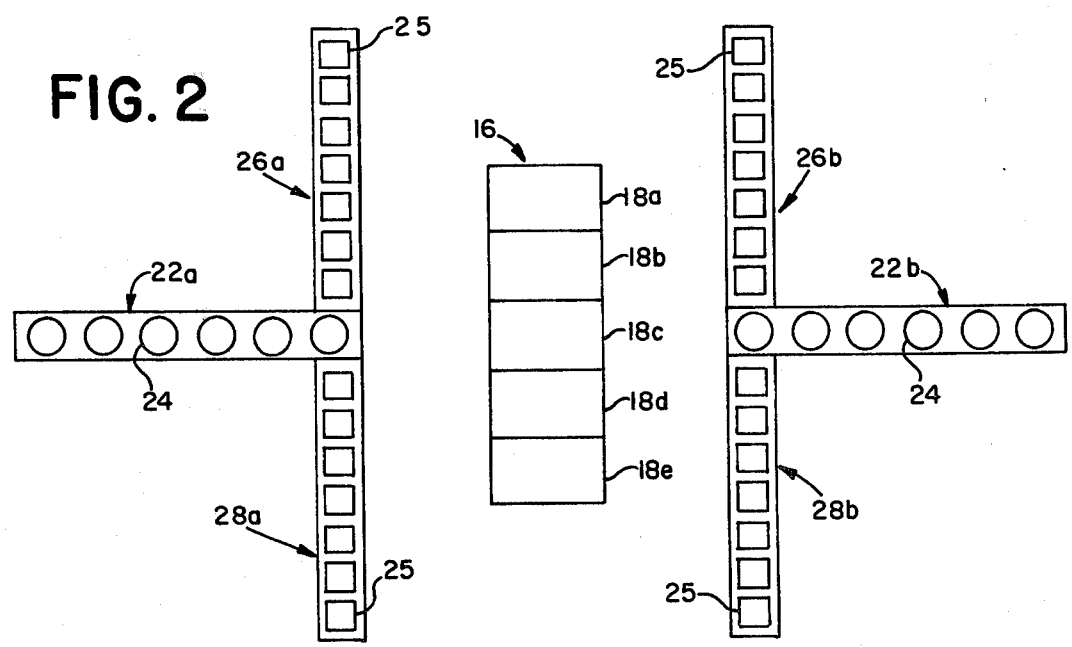
FIG. 2 shows a light array configured in accordance with the electro-optical display system of the present invention and in association with the FLOLS display illustrated in FIG. 1.

Referring now to FIG. 2, a set of four linear light arrays 26a, 26b, 28a and 28b is shown in association with the conventional FLOLS display 16. The arrays 26a, 26b, 28a and 28b, each consisting of a series of discrete light cells 25 in a linear configuration, are vertically-oriented and arranged symmetrically both above and below the datum bars 22a and 22b and on each side of Fresnel lenses 18a–18e. Preferably mounted at the inside edge of datum bars 22a and 22b, the vertical arrays 26a, 26b, 28a and 28b are fixed so that the upper arrays 26a and 26b are substantially parallel to each other and substantially aligned with the respective one of the lower arrays 28a and 28b on either side of the Fresnel lenses 18a–18e. The light cells 25 in each of the vertical arrays 26a, 26b, 28a and 28b are independently connected to be energized by a respective one of a plurality of voltage drive signals, as described in greater detail hereinafter in reference to FIG. 3. The light cells 25 should be of a uniform color selected on the basis of high relative detection and recognition levels as well as visual compatibility with the existing color configuration of the FLOLS display 16. Effective colors for light cells 25 are red, green, amber, and white, with green being preferred due to its greater compatibility with the FLOLS display 16.

Figure 4:
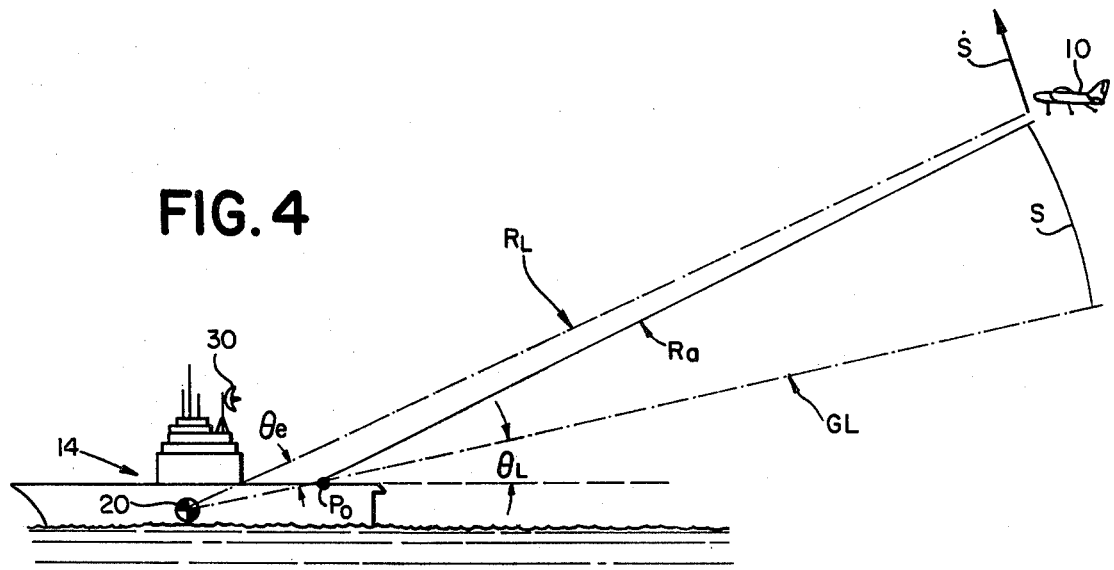
FIG. 4 is a general illustration of an aircraft approach to a carrier using the electro-opitcal display system of FIG. 3, particularly showing operating parameters thereof.
Figure 3:
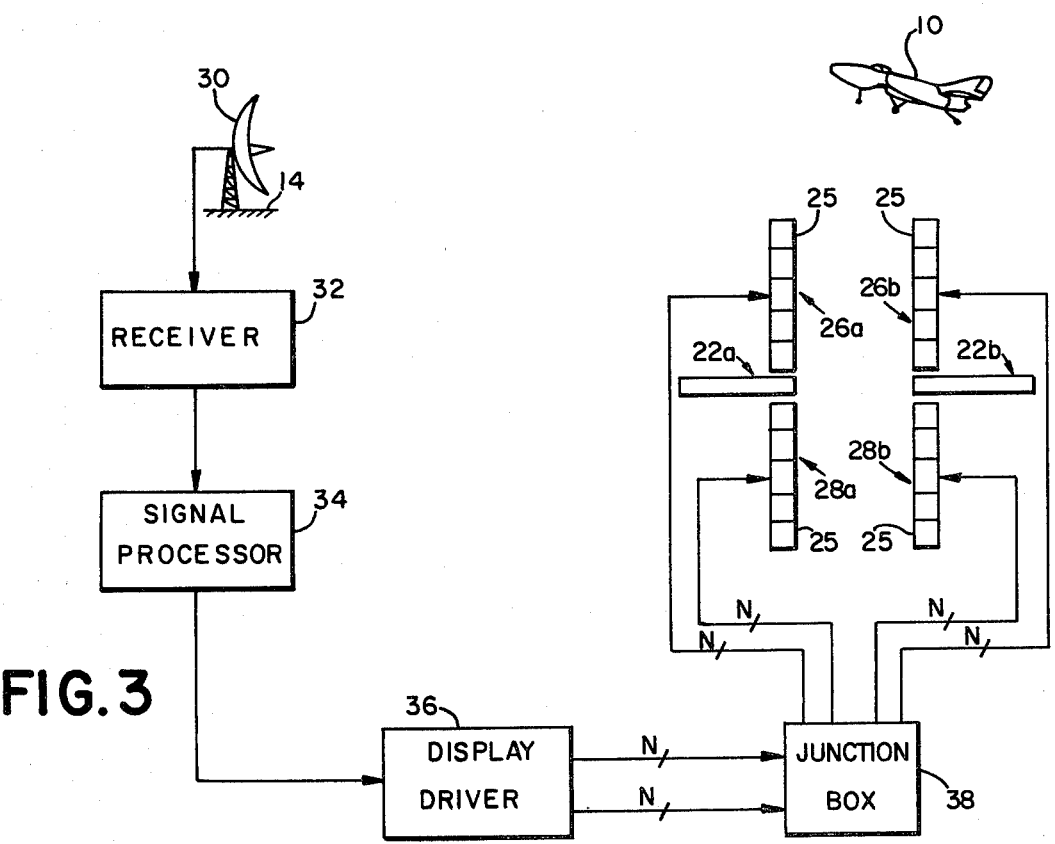
FIG. 3 is a block diagram of the electro-optical display system of the present invention including the light array of FIG. 2.

Referring now to FIGS. 3 and 4 in conjunction with FIG. 2, the light cells 25 of the vertically-oriented light arrays 26a, 26b, 28a and 28b are energized in succession, in accordance with the present invention, so as to appear as bars or continuous arrows extending up or down from the inside ends of datum bars 22a and 22b thereby providing visual cues of magnitude and direction for appropriate pilot response. A radar antenna 30 mounted upon the carrier 14 continuously scans the approach region providing conventional pulse radar signals indicative of azimuth and elevational of the aircraft 10. A conventional shipboard radar receiver unit 32, such as an AN/SPN-42 currently employed aboard Navy carriers, is connected to receive the radar signals from antenna 30 for producing a digital data signal at its output that is indicative of slant range ($R_L$) and elevation angle ($\theta_e$) of aircraft 10. The digital data signal produced by radar receiver unit 32 is electrically connected to the input of a signal processor 34. Signal processor 34 is a conventional digital device such as a digital computer or microprocessor, capable of receiving selected digital data and performing functional calculations thereupon in accordance with control algorithms.

Signal processor 34 may be governed in accordance with either of a pair of control guidance algorithms, called RATE and COMMAND. Obviously, other algorithms of similar function could be utilized. The RATE algorithm is a pure first-order algorithm capable of providing driving signals that energize light cells 25 upward or downward depending on whether the meatball visible on the FLOLS display 16 is moving up or down. The RATE algorithm further determines the length of the light cells 25 to be continuously energized, called arrow length ($1_a$), which is proportional to the difference between the actual descent rate (or vertical flight path component) of aircraft 10 and the descent rate (or vertical flight path component) that would maintain its present glideslope angle with respect to the point of origin ($P_o$) of FLOLS display 16. The RATE algorithm is as follows:

$$1_a = k_o \dot{s}$$

and $$\dot{s} = R_{Li}\left[\frac{(\theta_{ei} - \theta_{ei-1})}{\tau}\right]\frac{2\pi}{360}$$

where
- $\dot{s}$ = rate of aircraft displacement of perpendicular to $R_L$ (ft./sec)
- $R_{Li}$ = current slant range of aircraft from FLOLS virtual image (ft.)
- $\theta_{ei}$ = current angular displacement of aircraft from nominal glideslope (deg.)
- $\theta_{ei-1}$ = angular displacement of aircraft from nominal glideslope at previous sampling period (deg.)
- $k_O$ = constant arrow scale factor
- $\tau$ = the duration between sampling points (sec.)

and $\frac{2\pi}{360}$ = conversion constant from degrees to radians.

The COMMAND algorithm, of a higher-order system response than the RATE algorithm, is capable of providing driving signals that energize light cells 25 in proportion to the difference between the actual descent rate of aircraft 10 and an ideal descent rate, further providing upward energization of the light cells when the actual descent rate is too low and downward when it is too high. Accordingly, under the COMMAND algorithm null indications on the vertical arrays 26a, 26b, 28a and 28b would return the aircraft, or maintain it on, the desired glideslope G. In accordance with the COMMAND algorithm, the arrow length ($1_a$), is specifically proportional to the difference between the glideslope displacement rate ($\dot{s}$) and a commanded rate ($\dot{s}_c$) which is a function of glideslope displacement, specifying a unique exponential trajectory in the vertical plane that smoothly guides the aircraft 10 back to the glideslope GL for a given aircraft velocity, range and glideslope deviation. The COMMAND algorithm is as follows:

$$l_a = k_0 \dot{s}_e$$
and $$\dot{s}_e = \dot{s} - \dot{s}_c$$
where $\dot{s}_c$ is the commanded displacement rate, calculated from:
$$\dot{s}_c = k_f s$$
where $s$ = aircraft displacement perpendicular to $G_L$ (ft.)
$$= R_L \theta_3 \frac{2\pi}{360}$$
and $k_f$ = a constant, first derived analytically and then adjusted empirically during specific operations Based upon the control guidance algorithm, RATE or COMMAND, selected to govern its operation, the signal processor 34 produces an analog control signal having amplitude and polarity respectively, indicative of magnitude and direction of descent rate error of aircraft 10. A display driver 36 of conventional electronic design is connected to receive the analog control signal from signal processor 34 and serves to provide an interface for the proper energization of the light cells 25 of vertical arrays 26a, 26b, 28a and 28b. Display driver 36 is polarity-sensitive and provided with a plurality of amplitude-sensitive devices, such as triacs, equal in number (N) to the number of discrete light cells 25 in each vertical light array 26a, 26b, 28a and 28b and each independently set to detect N distinct threshold levels, of the control signal. As a result, display driver 36 generates either of a pair of outputs, corresponding to the upper vertical arrays 26a and 26b or the lower arrays 28a and 28b, with each output having as many as N distinct drive signals for energizing successive ones of light cells 25 in the appropriate arrays. A junction box 38 is connected to receive the output pair of N drive signals from display driver 36 for distribution of each output line to the separate upper and lower array pairs 26a and 26b and 28a and 28b.

It should be understood that, in operation, the light cells 25 in the vertical arrays 26a, 26b, 28a and 28b are thus energized in succession in accordance with the amplitude levels of the analog control signal produced by signal processor 34 and accordingly, would extinguish as the amplitude level of the control signal decayed. Once lighted, an individual light cell 25 would remain on until the level of the control signal, produced in accordance with either the RATE or COMMAND control guidance algorithm, fell below the preselected threshold level associated with that particular cell position in the particular vertical light array. The pilot of the approaching aircraft 10 would therefore see a continuous "arrow" indicating the magnitude and direction of the aircraft's descent rate error to cue a corrective action. Arrow displacement above the datum bars 22a and 22b are indicative of an insufficient rate of descent, while arrow displacement below the datum bars evidence an excessive sink rate. Obviously, the reverse signal polarity may be utilized if preferred.

Therefore, it is apparent that the disclosed invention provides in improved landing aid system, particularly useful aircraft carriers, for remotely guiding the descent approach of a fixed-wing aircraft, visually presenting information more closely simulating the control order and dynamics of the actual feedback between the pilot commands and the aircraft response thereto. The disclosed electrooptical display system provides a remote visual landing aid for aircraft carrier approaches that facilitates tracking of the desired glideslope during day or night operations so that the risks of landing accidents are significantly reduced. Furthermore, the disclosed display system augments the FLOLS presently used to guide aircraft carrier landings by enhancing the visual cueing information presented to the pilot through the addition of a visual indication of the magnitude and direction of aircraft movement relative to the desired glideslope. In addition, the present invention provides an improved aircraft carrier landing aid system that is simple yet reliable in performance, readily interpreted by pilots, and easily adapted to existing carrier-based landing operations.

Obviously, other embodiments and modifications of the present invention will readily come to those of ordinary skill in the art having the benefit of the teachings presented in the foregoing description and drawings. For example, instead of using radar, as described, to continuously track the aircraft and provide position and velocity data for processing, conventional optical or electro-optical tracking devices such as laser-related systems and video-contrast equipment, may be employed to practice the invention. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. An electro-optical display system for remotely aiding a pilot in landing an aircraft along a desired guideslope, comprising:
    tracker means for producing a digital data signal indicative of the aircraft slant range and elevation angle relative to a desired point of landing;
    signal processor means electrically coupled to receive the digital data signal from said tracker means and governed in accordance with a control guidance algorithm for producing an analog control signal having amplitude and polarity respectively indicative of the magnitude and direction of error in the appropriate descent rate of the aircraft relative to the glideslope; and
    display means electrically coupled to receive the control signal from said signal processor means, said display means being amplitude- and polarity-sensitive for providing a continuous visual indication of the instantaneous descent rate error to the pilot.

2. An electro-optical display system according to claim 1, wherein said display means comprises:
    a first pair of light arrays substantially parallel to each other, each of said first light arrays comprising a series of discrete light cells in a linear configuration;
    a second pair of light arrays substantially parallel to each other and aligned with respective ones of said first light arrays, each of said second light arrays comprising a series of discrete light cells in a linear configuration; and drive means electrically connected to said signal processor means and coupled to said first and second light arrays for continuously energizing said cells in succession in accordance with the amplitude and polarity of the analog control signal.

3. An electro-optical display system according to claim 2, wherein said display means further comprises:
a third pair of light arrays substantially perpendicular to and separating said first and second light arrays to provide a visual datum therebetween.

4. An electro-optical display system according to claim 3, wherein:
said first and second light arrays are substantially vertical in direction; and
said third light arrays are substantially horizontal.

5. An electro-optical display system according to claim 2, wherein said tracker means comprises:
radar receiver means for continuously tracking the aircraft to provide position and velocity data relative thereto.

6. In an optical guidance system for remotely aiding a pilot in the landing of an aircraft along a desired glideslope, of the type wherein light sources located behind vertically-stacked Fresnel lenses situated between two horizontal light arrays produce a virtual image of light which moves vertically as seen by the pilot to provide glideslope displacement information, the improvement comprising:
a first pair of light arrays substantially parallel to each other and mounted above the horizontal light arrays on either side of the lenses, each of said first light arrays comprising a series of discrete light cells in a linear configuration;
a second pair of light arrays substantially parallel to each other and aligned with respective ones of said first light arrays, said second pair of light arrays being mounted below the horizontal arrays on either side of the lenses, each of said second light arrays comprising a series of discrete light cells in a linear configuration; and
drive means sensitive to amplitude and polarity of analog signals provided at its input and electrically coupled at its output to said first and second light arrays for continuously energizing said cells in succession in accordance with an analog input signal indicative of the magnitude and direction of instantaneous error in the appropriate descent rate of the aircraft relative to the glideslope.

7. The improved optical system according to claim 6, further comprising:
tracker means for producing a digital data signal indicative of the aircraft slant range and elevation angle relative to a desired point of landing; and
signal processor means electrically coupled between said tracker means and said drive means and governed in accordance with a control guidance algorithm for producing the analog input signal having amplitude and polarity respectively indicative of the magnitude and direction of the instantaneous descent rate error of the aircraft.

8. The improved optical guidance system according to claim 7, wherein said tracker means comprises:
radar receiver means for continuously tracking the aircraft to provide position and velocity data relative thereto.

9. The improved optical guidance system according to claim 8, wherein:
said first and second light arrays are substantially vertical in direction.

* * * * *

UNITED STATES PATENT AND TRADEMARK OFFICE
CERTIFICATE OF CORRECTION

PATENT NO. : 4,414,532
DATED : November 8, 1983
INVENTOR(S) : Charles E. Kaul

It is certified that error appears in the above-identified patent and that said Letters Patent are hereby corrected as shown below:

Column 8, line 14, after "optical" insert -- guidance --.

Signed and Sealed this

Fourteenth Day of August 1984

[SEAL]

Attest:

GERALD J. MOSSINGHOFF

Attesting Officer    Commissioner of Patents and Trademarks